United States Patent [19]

St. Romain

[11] Patent Number: 5,069,293

[45] Date of Patent: Dec. 3, 1991

[54] TURF PLUG CATCHER

[76] Inventor: Thomas E. St. Romain, 1622 Enterprise Blvd., Lake Charles, La. 70601

[21] Appl. No.: 562,247

[22] Filed: Aug. 3, 1990

[51] Int. Cl.$^5$ .................. A01B 45/02; A01D 34/12; A01D 34/48

[52] U.S. Cl. ...................... 172/22; 56/203; 171/144

[58] Field of Search .................. 414/486; 172/21, 22, 172/DIG. 25; 171/7, 12, 144; 37/4; 56/199, 202, 203

[56] References Cited

U.S. PATENT DOCUMENTS

| | | | |
|---|---|---|---|
| 286,925 | 3/1928 | Shaw | 56/DIG. 12 |
| 2,088,209 | 7/1937 | Nolte | 172/22 |
| 2,520,488 | 8/1950 | Batchelder | 172/21 |
| 2,738,633 | 3/1956 | Bestland et al. | 171/144 |
| 2,881,844 | 4/1959 | Miller | 172/22 |
| 3,022,833 | 2/1962 | Reaser | 172/22 |
| 3,429,378 | 2/1969 | Mascaro | 172/22 |
| 3,797,578 | 3/1974 | Velasquez | 172/22 |
| 3,889,761 | 6/1975 | Rogers | 172/22 |
| 4,148,362 | 4/1979 | Orth | 172/22 |
| 4,296,818 | 10/1981 | Malinowski et al. | 171/144 |
| 4,422,510 | 12/1983 | De Ridder | 172/21 |
| 4,796,322 | 1/1989 | Steed et al. | 15/79 |
| 5,002,453 | 3/1991 | Shizehisa | 172/22 |

FOREIGN PATENT DOCUMENTS 252906 5/1963 Australia .

OTHER PUBLICATIONS

Cushman Brochure, p. 14, "Turf-Care Vehicles and Accessories", and pp. 10–11, Core Harvestor attachment.

Primary Examiner—Dennis L. Taylor
Assistant Examiner—Spencer K. Warnick
Attorney, Agent, or Firm—David L. Ray

[57] ABSTRACT

This is an apparatus having a flat bottom and generally vertical walls for enclosing and containing plugs of turf discharged from a turf aerating machine. The apparatus includes a pan having a generally flat bottom and generally vertical side walls extending upwardly from the flat bottom. The pan is pivotally connected to the turf aerating machine by a hydraulic lifting apparatus, and the pan is located sufficiently close to the aerating machine to receive plugs of turf discharged from the turf aerating machine. The pan has a tilting apparatus connected thereto which allows the pan to be tilted to dump turf plugs collected therein when desired.

16 Claims, 2 Drawing Sheets

TURF PLUG CATCHER

BACKGROUND OF THE INVENTION

1. Field of the Invention

The present invention relates to machines utilized for aerating golf course fairways and greens, and lawns by mechanical removal of cylindrical plugs of turf from the fairway, green, or lawn. In particular, the present invention is related to collecting and catching the cylindrical plugs after they are removed from the fairway, green, or lawn by the aerator machine.

2. Description of the Related Art

Devices for perforating and for removing plugs of turf from lawns are well known in the art. Typical of such devices are those shown in the following U.S. Patents:

U.S. Pat. No. 2,881,844 discloses a turf plug cutter for cutting plugs of turf for transplanting to establish new growths of turf without the necessity of planting seed. The turf plug cutter includes a frame, a fluid motor on the frame, and a piston connected to a tubular cutter member for reciprocating the same, a valve on the frame for selectively admitting fluid pressure to one side or the other of the piston, means normally urging the valve to a position to admit pressure below the piston to hold the cutter member in its upper position, a solenoid for moving the valve to a position to admit pressure to the motor to drive the cutter member downward, a manually actuable switch in circuit with the solenoid to initially energize the solenoid, and switches on the frame actuable by the cutter member at the ends of its stroke to alternately energize and de-energize the solenoid.

U.S. Pat. No. 3,022,833 discloses a sod plug cutting machine adapted to be drawn over the ground and having a wheel-like drum with spaced tubular digging elements extending radially from the periphery thereof which are forced into the ground during rotation of the drum-like member to dig sod plugs to be transplanted or to dig sod plug holes in a lawn to be treated. The machine includes a wheel having a rim, a plurality of circumferentially spaced circular apertures in the wheel rim, a tubular member fixed on the wheel rim at each circular aperture and extending radially inwardly therefrom and terminating in an inner portion turned outwardly relative to a side of the wheel, the tubular members each having a through bore with a counterbore extending therein from the wheel rim and in registry with the respective circular aperture, a plurality of tubular digger elements open at each end thereof, the digger elements each having one end portion sleeved in a respective counterbore with the other end of each of the digger elements extending radially and outwardly from the wheel rim, and means removably engaging the tubular member and the respective digger element for securing the digger element to the tubular member, the tubular digger elements each having a bore with a tapered portion adjacent the outer end thereof and terminating in a cutting edge for cutting a cylindrical plug of smaller diameter than the bore in the cutting element and the tubular member remote from the cutting edge whereby plugs are cut and retained in the tapered portion of the bore and subsequent plugs cut by the respective digger element force the first cut plug into the bore remote from the tapered portion for gravitational movement from the open end of the outwardly turned portion of the respective tubular member upon inversion thereof.

U.S. Pat. No. 4,148,362 discloses a penetrating machine or lawn perforating machine for forming rows of holes in the ground including a perforating roller which is adapted to roll on the ground and whose peripheral surface carries perforating tubes mounted for pivotal movement about axes extending parallel to the axis of the roller so that from the beginning to the end of their contact with the ground their axes remain substantially perpendicular to the ground. Part of the periphery of the roller is enclosed by a guide plate to intercept plugs of earth formed by the perforating tubes. In one embodiment a spring comb is disposed behind the roller to produce clean holes even in wet ground.

U.S. Pat. No. 4,422,510 discloses an apparatus for the provision of vertical drain channels in grass, fields, meadows, etc.. A frame is provided journalling a rotary shaft having a lever system for rectilinearly driving at least one set of pins into and out of the ground. The lever system has a pair of substantially parallel spaced rods connected pivotally at one end to the set of pins and at the other end pivotally to the frame and offset from each other. The lower rod is extendible in length when the pins are placed under load and automatically resumes its normal length when the load is removed.

Devices of the prior art for catching plugs of turf generated by plug cutting devices of the prior art are exemplified by the following patent:

U.S. Pat. No. 3,797,578 discloses a plug catcher for a green aerator which temporarily catches the small plugs of turf as extracted by a turf-aerating machine, the catcher being characterized as particularly easy to attach and remove from the gleaning edge, that is, the front or leading edge, of the catcher only a small fraction of an inch from the ground, this distance being regulated effectively by locating this edge closely adjacent to the ground contact points of the rear supporting wheels of the aerator machine. The catcher is essentially a platform and is illustrated as having a wall making the same box-like and it is substantially balanced upon ground-contacting casters with the front end releasibly latched onto the axle of the aerator and dimensioned to extend below the axle, immediately to the rear of the aerator's plug extractors, so that the aforementioned gleaning edge brushes the grass of the fairway turf, being positively held in this turf-engaging position, to sweep the extracted plugs into the box-like enclosure of the catcher. Handling the aerator and catcher is ordinarily a two-man job and two axle-engaging latch hooks, one at each side, are provided for attaching and handling the catcher, which when loaded with extracted turf plugs is lifted from the aerator machine and ordinarily emptied into a truck or cart.

SUMMARY OF THE INVENTION

In accordance with the present invention there is provided an apparatus having a flat bottom and generally vertical walls for enclosing and containing plugs of turf discharged from a turf aerating machine. The apparatus includes a pan having a generally flat bottom and generally vertical side walls extending upwardly from the flat bottom. The pan is pivotally connected to the turf aerating machine by a hydraulic lifting apparatus, and the pan is located sufficiently close to the aerating machine to receive plugs of turf discharged from the turf aerating machine. The pan has a tilting apparatus connected thereto which allows the pan to be tilted to dump turf plugs collected therein when desired.

Preferably a turf plug deflector is connected to the turf aerating machine for deflecting plugs of turf into the pan. The turf plug deflector is preferably a net which is connected to the turf aerating machine and to the pan to direct all of the plugs of turf discharged from the aerating machine into the pan.

The pan also preferably has a brush attached to the rear end of the pan to brush plugs of turf, dirt, grass or other debris from the ground or turf on which the apparatus of the invention is being utilized.

Furthermore, the pan preferably has a generally vertical pusher blade located at the front of the pan for pushing in front of the pan any turf plugs, dirt, grass, or other debris that may be lying on the ground or turf over which the pan is traveling.

The apparatus of the invention has the advantage of providing quick and easy collection of turf plugs as they are being discharged from a turf aerating machine, and of providing transport to a desired location. Utilizing the apparatus of the invention, a golf course putting green or other lawn can be maintained in a clean, smooth condition as the green is being aerated.

An additional advantage of the apparatus of the invention is that turf plugs, grass, and other debris discharged by the aerating machine to which the apparatus of the invention is attached may be transported away from the green to any desired location for discharge without the operator of the aerating machine having to dismount from the tractor or other vehicle to which the aerating machine is attached.

Another advantage of the apparatus of the invention is that the apparatus may be quickly and easily attached to existing aerating machines without extensive and expensive modification of the machine to which the invention is attached.

The apparatus of the invention also has the advantages of being low in weight since the pan can be made of plastic.

BRIEF DESCRIPTION OF THE DRAWINGS

The invention will be more easily understood by reference to the drawings, in which.

DESCRIPTION OF THE PREFERRED EMBODIMENTS

Figure 1:
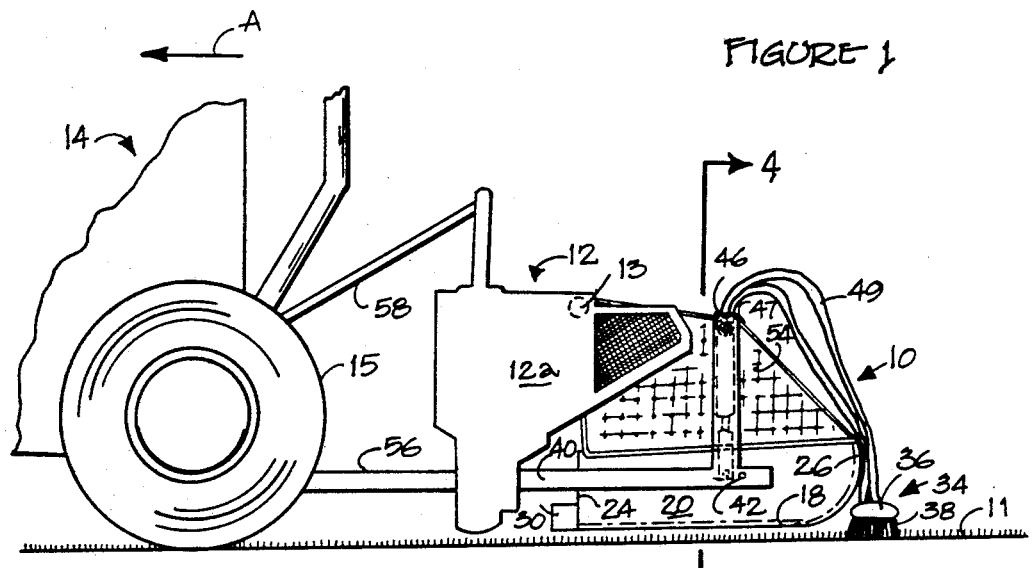
FIG. 1 is an elevational view, partly cut-away, of the apparatus of the invention connected to an aerating machine with the aerating machine in the operating or lowered position.
Figure 2:
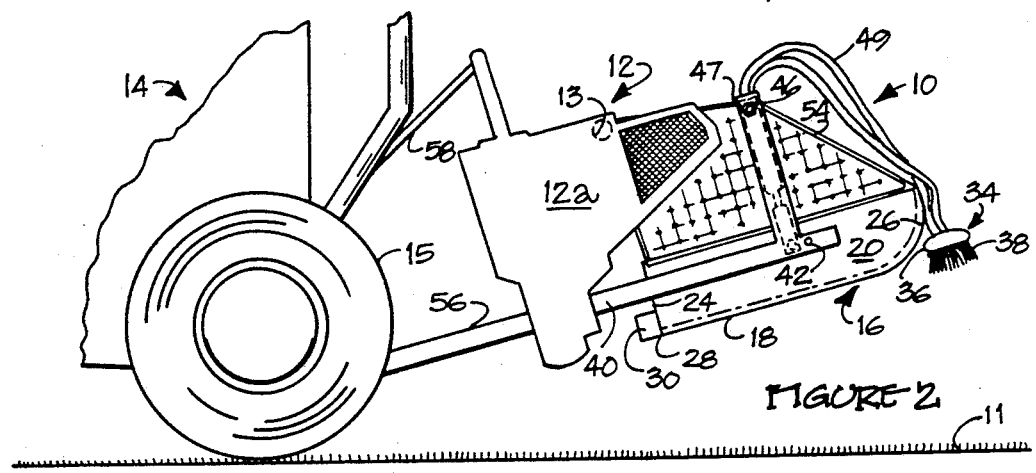
FIG. 2 is an elevational view, partly cut-away, of the apparatus of the invention connected to an aerating machine with the aerating machine in the non-operating or raised position.
Figure 3:
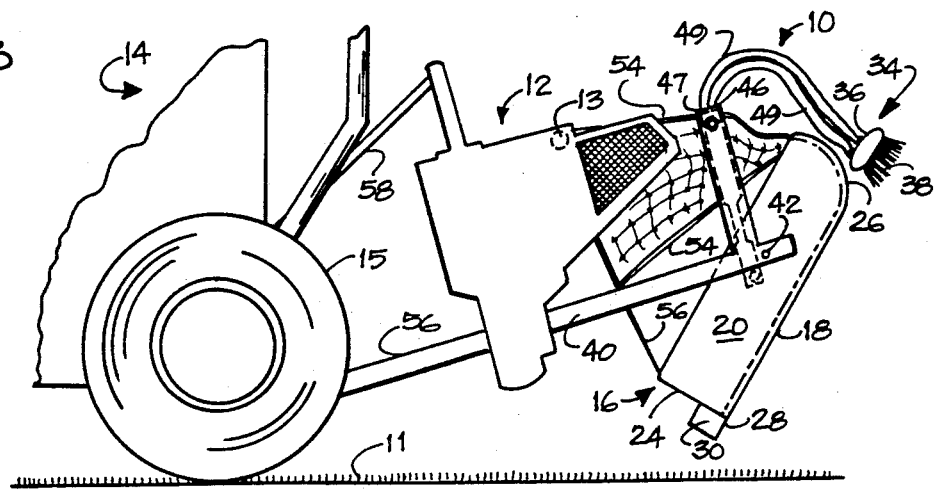
FIG. 3 is an elevational view, partly cut-away, of the apparatus of the invention connected to an aerating machine with the aerating machine in the non-operating or raised position and the apparatus of the invention in the dumping position.
Figure 4:
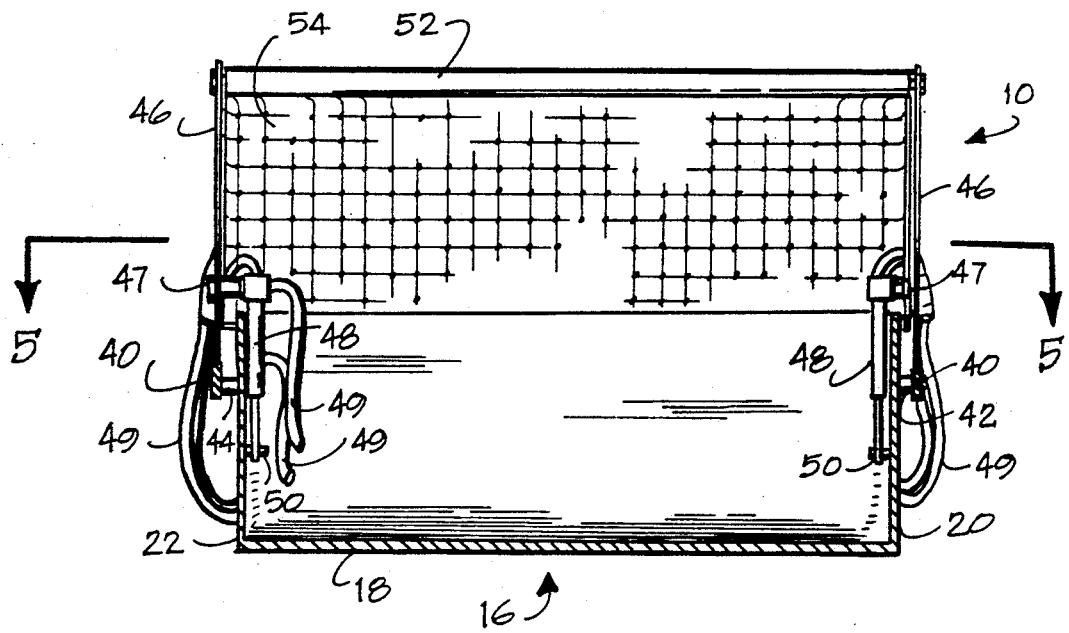
FIG. 4 is a plan view of the apparatus of the invention taken along lines 4—4 of FIG. 1.

Referring now to the drawings, in FIGS. 1-5 the turf plug catching apparatus of the invention is generally indicated by the numeral 10, and in FIGS. 1-3 a conventional aerating machine of the prior art is generally indicated by the numeral 12. Aerating machine 12 has two sides 12a connected by a horizontal bar or cross member 13. The aerating machine 12 is connected to a tractor or other vehicle generally indicated by the numeral 14. Tractor 14 has drive wheels 15 and travels in the direction indicated by the arrow A shown in FIG. 1 when a golf course putting green 11 or other turf is being aerated. The turf plug catching apparatus of the invention may be utilized with most conventional aerating machines and tractors.

Apparatus 10 can be seen in the drawings to include a pan generally indicated by the numeral 16. Pan 16 preferably has a flat, rectangular bottom 18. A typical pan 16 has a bottom 18 which is about five feet wide and two and one-half feet deep.

Extending perpendicularly upward from pan bottom 18 are the two parallel side walls 20 and 22, all of which are typically about one foot in height. Also extending perpendicularly upward from the front of pan bottom 18 is front wall 24 which is connected to, and preferably integrally molded with, bottom 18 and side walls 20 and 22. Front wall 24 is typically about three to four inches in height, or about one-third to about one-fourth the height of side walls 20 and 22.

Curving upward from the rear of pan bottom 18 is rear wall 26 which is connected to, and preferably integrally molded with, bottom 18 and side walls 20 and 22. Rear wall 26 is typically about one foot in height.

Connected to front wall 24 preferably is pusher blade 28 which is shown in FIGS. 1-3 and FIG. 5. Pusher blade 28 has two wings 30 and 32 at each end thereof which form an angle with the plane in which pusher blade 28 lies of about 45°. Wings 30 and 32 prevent dirt, grass, or other debris being pushed by blade 28 from sliding off the ends of blade 28. Preferably pusher blade 28 is slightly smaller (about one sixteenth inch smaller) in height than front wall 24, and is connected to front wall 24 so that the top of pusher blade 28 is flush with the top of front wall 24. Although pusher blade 28 is preferred, if desired, the pusher blade 28 could be omitted.

Connected to the rear wall 26 of pan 10 is preferably the brush generally indicated by the numeral 34. Brush 34 preferably has a wooden or plastic top 36 into which are fitted conventional bristles 38. Brush 34 is utilized to sweep any dirt, grass, or other debris from the turf or green over which the apparatus 10 is travelling which was missed by pusher blade 28. Although brush 34 is preferred, the brush 34 could be omitted if desired.

Figure 5:
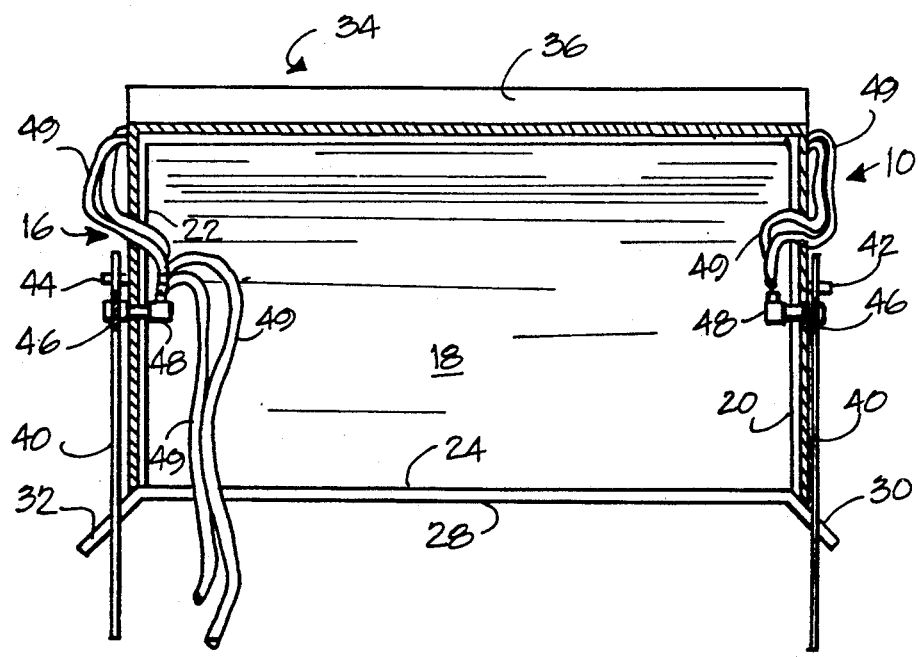
FIG. 5 is a plan view of the apparatus of the invention taken along lines 5—5 of FIG. 4.

The side walls 20 and 22 of pan 16 are rotatably connected to rigid pan support members 40—40 by pins 42 and 44, respectively, shown in FIG. 5. Rigid pan support members 40—40 are preferably identical in shape and composition and are preferably flat, rectangular bars made from steel or aluminum.

Extending upward perpendicularly from rigid pan support members 40—40 are rigid cylinder support members 46—46. Rigid cylinder support members 46—46 are identical in shape and composition and are preferably flat, rectangular bars made from steel or aluminum.

Rotatably connected to the upper ends of rigid cylinder support members 46—46 by pins 47—47 are hydraulic or pneumatic cylinders 48—48 having hydraulic or pneumatic supply lines 49 connected thereto and to a source of hydraulic fluid or air. Hydraulic or pneumatic cylinders 48—48 are rotatably connected to side walls 20 and 22 of pan 16 by pins 50—50 shown in FIG. 4.

Thus, when hydraulic or pneumatic cylinders 48—48 are actuated by the operator, the apparatus 10 will either assume the position shown in FIG. 1, or the dumping position shown in FIG. 3, as desired by the operator. Of course, the aerating machine 12 must be lifted to the position shown in FIG. 2 before pan 16 is dumped.

Connected to the upper ends of rigid cylinder support members 46—46 is horizontal bar 52. Horizontal bar 52 supports net 54 which lies over horizontal support bar 52 and is connected to pan 16 at the upper edge of rear side 26 and to aerating machine 12 at horizontal bar 13 of aerating machine 12. Net 54 lies along the upper edges of sides 20 and 22 and over the top of pan 16 to catch and direct turf plugs discharged from aerating machine 12 to pan 16 when pan 16 is in the position shown in FIG. 1. Net 54 has elastic straps 56 shown in FIG. 3 connected to the top front corner of each side wall 20 and 22 which stretches when pan 16 is being dumped. Net 54 is sufficiently small in mesh size to contain plugs being discharged from aerating machine 12.

Rigid pan support members 40—40 are rigidly connected by bolts or the like to aerating machine 12 as shown in FIGS. 1-3 and are located so that the bottom 18 of pan 16 is located at ground or green level and the bottom of pusher blade 28 is about one-sixteenth of an inch above green 11 when the apparatus 10 is in the position shown in FIG. 1 for aerating green 11 and catching plugs discharged from aerating machine 12. Aerating machine 12 is connected to tractor 14 by support members 57 and 58 shown in FIGS. 1-3.

Although the preferred embodiments of the present invention have been disclosed and described in detail above, it should be understood that the invention is in no sense limited thereby, and its scope is to be determined by that of the following claims:

What is claimed is:

1. An apparatus for catching and collecting plugs of turf as they are extracted from the ground by an aerating machine having turf plug extractors which extract and discharge said plugs of turf, said apparatus comprising:
   a. pan means for receiving and containing said plugs of turf discharged from said aerating machine, a front wall having blade means connected thereto for pushing grass, turf plugs, or other debris in front of said pan means,
   b. pan support means rotatably connected to said pan means and rigidly connected to said aerating machine,
   c. lifting means for selectively lifting said aerating machine above the ground, and
   d. actuator support means connected to said pan support means for supporting actuators which selectively rotate said pan means to dump said turf plugs contained in said pan means, said pan means being adapted to selectively rotate downward about a transverse axis to dump turf plugs on the ground beneath said pan support means when said aerating machine is lifted above the ground.

2. The apparatus of claim 1 wherein said pan means has deflector means connected thereto for deflecting said plugs of turf being discharged by said aerating machine into said pan means.

3. The apparatus of claim 2 wherein said deflector means comprises net means connected to said pan means and said aerating machine means.

4. The apparatus of claim 1 wherein said pan support means is rotatably connected to said pan means by a pin.

5. The apparatus of claim 4 wherein said actuator support means is rotatably connected to said actuators.

6. The apparatus of claim 5 wherein said actuators are hydraulic or pneumatic cylinders.

7. The apparatus of claim 5 wherein said pan means is rotatably connected to said actuators.

8. The apparatus of claim 5 wherein said actuator support means are connected by a bar.

9. An apparatus for catching and collecting plugs of turf as they are extracted from the ground by an aerating machine having turf plug extractors which extract and discharge said plugs of turf, said apparatus comprising:
   a. pan means for receiving and containing said plugs of turf discharged from said aerating machine, said pan means having bottom means for positioning generally parallel to the ground when said plug are being received in said pan means, said bottom means having two side wall means extending upwardly therefrom, a front wall means extending upwardly therefrom, and a rear wall means extending upwardly therefrom, said front wall means having blade means connected thereto for pushing grass, turf plugs, or other debris in front of said pan means,
   b. pan support means rotatably connected to said pan means and rigidly connected to said aerating machine,
   c. lifting means for selectively lifting said aerating machine above the ground,
   d. brush means connected to said rear wall means of said bottom means of said pan means for brushing grass, turf plugs, or other debris,
   e. deflector means connected to said pan means for deflecting said plugs of turf being discharged by said aerating machine into said pan means, and
   f. actuator support means rigidly connected to said pan support means for supporting actuators which selectively rotate said pan means downward to dump turf plugs contained in said pan means on the ground beneath said pan support means when said aerating machine is selectively raised above the ground by said means for lifting said aerating machine above the ground, said actuator support means being rotatably connected to said actuators, said actuators being rotatably connected to said pan means.

10. The apparatus of claim 9 wherein said bottom means, said two side wall means, said front wall means, and said rear wall means are integrally molded from a single material.

11. The apparatus of claim 9 wherein said front wall means is smaller in height than said side wall means and said rear wall means.

12. The apparatus of claim 9 wherein said side wall means and said rear wall means are equal in height and said front wall means is one-third to one-fourth the height of said rear and said side wall means.

13. The apparatus of claim 9 wherein said rear wall means has brush means connected thereto for brushing grass, turf plugs, or other debris said pan means.

14. The apparatus of claim 9 wherein said side walls and said rear wall are about equal in height and said front wall is about one-third to about one-fourth the height of said rear and said side walls.

15. The apparatus of claim 9 wherein said deflector means comprises net means connected to said pan means and said aerating machine.

16. The apparatus of claim 9 wherein said actuators are hydraulic or pneumatic cylinders.

* * * * *